C. STAAFF & J. G. JANSON.
GARDEN TOOL HANDLE.
APPLICATION FILED JULY 5, 1917.

1,262,862.

Patented Apr. 16, 1918.

Inventor
C. Staaff & J. G. Janson

UNITED STATES PATENT OFFICE.

CHARLES STAAFF AND JOHN G. JANSON, OF CONVENT, NEW JERSEY.

GARDEN-TOOL HANDLE.

1,262,862.     Specification of Letters Patent.     Patented Apr. 16, 1918.

Application filed July 5, 1917. Serial No. 178,747.

*To all whom it may concern:*

Be it known that we, CHARLES STAAFF and JOHN G. JANSON, citizens of the United States, residing at Convent, in the county of Morris, State of New Jersey, have invented certain new and useful Improvements in Garden-Tool Handles; and we do hereby declare the following to be a full, clear, and exact description of the invention, such as will enable others skilled in the art to which it appertains to make and use the same.

This invention relates to improvements in tool handles and particularly to handles for garden tools.

One object of the present invention is to provide a device which will receive and hold the shanks of a number of different kinds of tool heads.

Another object is to provide a novel means for holding the tool shank in the handle, and also for preventing the rattling or chattering of the shank while the tool is in operation.

Other objects and advantages will be apparent from the following description when taken in connection with the accompanying drawing.

Figure 1:
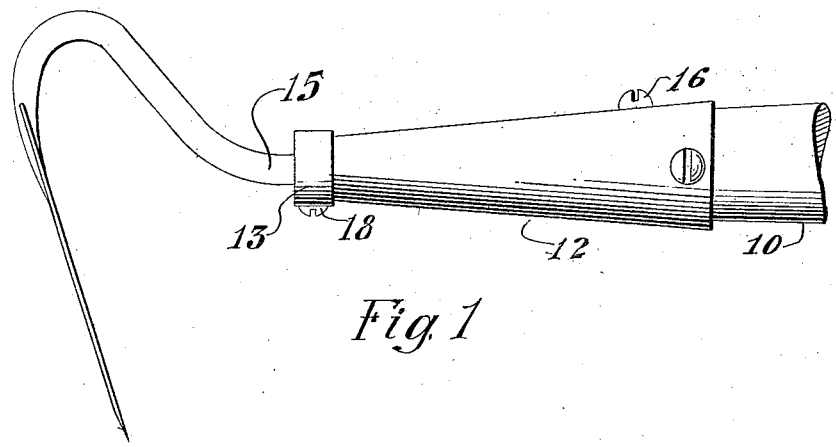
Figure 1 is a side elevation of a handle made in accordance with my invention, and showing a tool secured therein.
Figure 2:
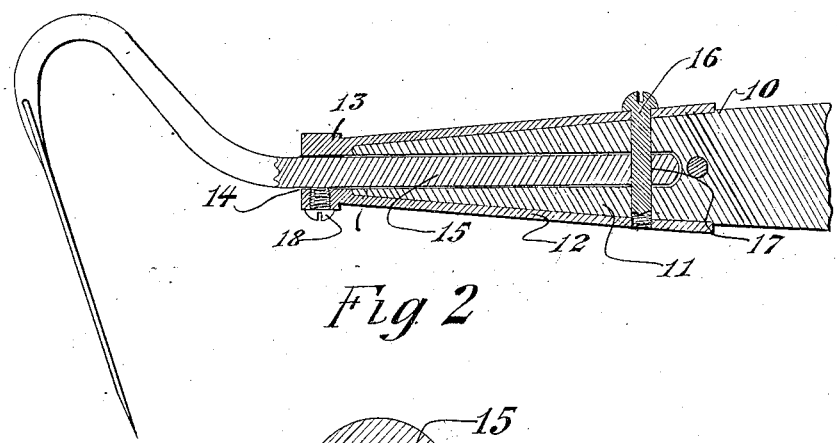
Fig. 2 is a vertical longitudinal sectional view taken on a line centrally of Fig. 1.
Figure 3:
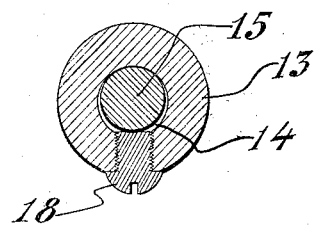
Fig. 3 is a transverse sectional view through the outer end of the handle to show the arrangement of the outer screw.

Referring particularly to the accompanying drawing 10 represents a portion of a garden tool handle such as used on hoes, rakes, and like tools, the handle being made of wood. One end of the handle is reduced, as at 11, and on this reduced end is secured the ferrule 12. The outer end of the ferrule is thickened, as indicated at 13, and is formed with an opening 14 of a diameter slightly greater than that of the tool shank 15, which is to be inserted therethrough.

A screw or bolt 16 is disposed transversely through the inner or larger end of the ferrule, and this bolt is arranged to pass through an opening 17 formed in the inner end of the shank 15. Thus the shank is firmly held from removal from the handle.

It has been found, however, that the portion of the shank which is disposed in the outer end of the ferrule, or in the opening 14, is subject to lateral play, whereby the shank will rattle or chatter while the tool is in operation. To obviate this annoyance, we dispose a screw 18 through one side of the thickened portion of the ferrule which is adapted to be driven into engagement with the shank, and thus hold the same firmly against any movement.

Thus the shank of the tool is held from removal by the screw 16 and the same held from any lateral play or rattling by the screw 18.

While we have shown a hoe blade and shank secured within the handle, we wish it understood that other tools having similar shanks are readily adapted for substitution for the tool shown.

What is claimed is:

A tool handle including a stem, a ferrule secured to one end of the stem, said ferrule having a thickened outer end, a tool shank disposed in the ferrule and having a transverse opening in the inner end thereof, a screw disposed transversely through the inner portion of the ferrule and through said opening of the shank, and a screw disposed through one side of the thickened portion of the ferrule and binding against the adjacent portion of the shank to prevent lateral play thereof in the ferrule.

In testimony whereof, we affix our signatures in the presence of witnesses.

CHARLES STAAFF.
JOHN G. JANSON.

Witnesses:
D. F. WILLIAMSON,
ENOS A. NORTON,
JAMES H. LYON,
TIMOTHY W. SWEENEY.

Copies of this patent may be obtained for five cents each, by addressing the "Commissioner of Patents, Washington, D. C."